United States Patent
Jin et al.

(10) Patent No.: US 8,473,493 B2
(45) Date of Patent: Jun. 25, 2013

(54) SYSTEM AND METHOD FOR SELECTIVE INFORMATION AND RESOURCE SHARING

(75) Inventors: Hongxia Jin, Santa Clara, CA (US); Qihua Wang, West Lafayette, IN (US)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 12/693,703

(22) Filed: Jan. 26, 2010

(65) Prior Publication Data

US 2011/0184937 A1 Jul. 28, 2011

(51) Int. Cl.
*G06F 17/30* (2006.01)

(52) U.S. Cl.
USPC ............ 707/736; 707/706; 707/722; 707/758

(58) Field of Classification Search
USPC ................... 707/999.001, 706, 722, 736, 758
See application file for complete search history.

(56) References Cited

U.S. PATENT DOCUMENTS

| | | | |
|---|---|---|---|
| 2007/0016575 A1* | 1/2007 | Hurst-Hiller et al. ............. | 707/5 |
| 2007/0078938 A1 | 4/2007 | Hu et al. | |
| 2007/0255715 A1* | 11/2007 | Li et al. ............................. | 707/10 |
| 2008/0065995 A1* | 3/2008 | Bell et al. ........................ | 715/751 |
| 2008/0140674 A1 | 6/2008 | Ishikawa | |
| 2008/0147818 A1* | 6/2008 | Sabo ............................... | 709/206 |
| 2008/0183694 A1* | 7/2008 | Cane et al. ........................ | 707/5 |
| 2008/0183703 A1* | 7/2008 | Agrawal et al. .................... | 707/5 |
| 2008/0282198 A1* | 11/2008 | Brooks et al. .................. | 715/854 |
| 2009/0006285 A1* | 1/2009 | Meek et al. ...................... | 706/12 |
| 2009/0006442 A1 | 1/2009 | Anderson et al. | |
| 2009/0292930 A1* | 11/2009 | Marano et al. ................... | 713/189 |
| 2009/0307224 A1* | 12/2009 | Amin et al. ........................ | 707/9 |
| 2010/0169344 A1* | 7/2010 | Ellis et al. ..................... | 707/758 |
| 2010/0250131 A1* | 9/2010 | Relyea et al. ................. | 701/213 |

FOREIGN PATENT DOCUMENTS

| | | |
|---|---|---|
| JP | 2006-004277 | 1/2006 |
| JP | 2006-133841 | 5/2006 |

OTHER PUBLICATIONS

Farrell, S. et al., "Socially Augmenting Employee Profiles With People Tagging", Proceedings of the 20th Annual ACM Symposium on User Interface Software and Technology, pp. 91-100, 2007.

Schmidt, A. et al., "People Tagging & Ontology Maturing: Towards Collaborative Competence Management" FZI Research Center for Information Technologies at the University of Karlsruhe, Germany, 2008.

Pearlman, L. et al., "A Community Authorization Service for Group Collaboration", Proceedings of the Third International Workshop on Policies for Distributed Systems and Networks, 2002. pp. 50-59, 2002.

(Continued)

*Primary Examiner* — Dennis Truong
(74) *Attorney, Agent, or Firm* — Shimokaji & Assoc, PC

(57) ABSTRACT

A method and system of automatically identifying a set of relevant and qualified recipients to share electronic data is disclosed. The system includes an electronic network configured to store and transmit the electronic data files. The electronic data files include one or more data tags defining a sharing condition that targets potential recipients of the data files or permits access to the data files. A people-tagging system provides an electronic platform including keyword lists (tags) defined by recipient users collaboratively. A matching tool includes software matching recipient users to the data files when the recipient users are associated with keyword lists that satisfy the sharing condition. The method includes tagging a data file by one or more keywords and using a people-tagging system where the recipient users define a list of tags on topics of interest. Recipient users are matched to data files when user lists of tags satisfying the sharing condition.

20 Claims, 6 Drawing Sheets

OTHER PUBLICATIONS

Bownam, C. Mic et al., "The Harves Information Discovery and Access System", Computer Networks and ISDN Systems, vol. 28, Issues 1-2, pp. 119-125, Dec. 1995.

Vob, Jakob, "Tagging, Folksonomy & Co—Renaissance If Manual Indexing?", Information Retrieval, Jan. 2007.

* cited by examiner

SYSTEM AND METHOD FOR SELECTIVE INFORMATION AND RESOURCE SHARING

BACKGROUND OF THE INVENTION

The present invention relates generally to the field of data distribution and access, and more specifically, to the distribution and receipt of data through automatically identifying relevant and qualified recipients based on people information from existing people tagging systems.

The distribution of information has been enhanced with the advent of electronic mail systems and social networks. Some individuals, whether in a business organization or in a civilian setting, share common interests or dilemmas. Thus, one way to share a person's ideas with others is to send out a mass mailed electronic mail message. In another case, one may need input on a business project within an organization and may broadcast a call for assistance to others in the organization. However, unsolicited messages may garner the ire of others if a recipient has no interest in the message topic. It may thus, be desirable to send a message only to the group of people who are likely to be relevant or qualified in the topic of the message.

It is known to target messages to others by manually selecting a group of individuals that may be relevant to the message. This can be a time consuming process when one works in a relatively large organization. Additionally, one risks missing a relevant recipient if the sender does not know the interests or expertise among potential recipients and fails to select such a person.

Therefore, it can be seen that there is a need for a system and method to distribute and provide access to electronic messages/files that targets recipients based on recipients' topics of interest.

SUMMARY OF THE INVENTION

In one aspect, the present invention comprises a system for sharing electronic data files, comprises an electronic network configured to store and transmit the electronic data files wherein the electronic data files include one or more data tags defining a sharing condition; a tagging system connected in data communication with the electronic network wherein the tagging system provides an electronic platform configured to store and update data tags defined by recipient users; and a recipient selection tool including software configured to match recipient users to transmitted electronic data files wherein the recipient users are associated with data tags that satisfy the sharing condition.

In another aspect, the present invention comprises a method of distributing an electronic message from a sender to one or more recipients, including marking the electronic message with tags; specifying a sharing condition for targeting potential recipients of the electronic message wherein the sharing condition is based on the tags; identifying recipients with predetermined data tags satisfying the sharing condition; and transmitting the electronic message to the identified recipients In another aspect, the present invention comprises a method of providing electronic access to a file resource stored on a host server, by specifying a sharing condition for permitting access to the file resource based on keywords tagged in the file resource; receiving a request for access to the file resource from a user; receiving user data associated with the user wherein the user data includes a list of keywords associated with the user; evaluating whether the user's list of keywords satisfies the sharing condition; denying the user access to the resource file on the host server if the sharing condition is not satisfied; and granting the user access to the resource file on the host server if the sharing condition is satisfied.

In a further aspect, the present invention a computer program product for distributing an electronic message, the computer program product comprises a computer usable medium having computer usable program code embodied therewith, the computer usable program code comprising: computer usable program code configured to mark the electronic message with data tags; computer usable program code configured to specify a sharing condition for targeting potential recipients of the electronic message wherein the sharing condition is based on the data tags; computer usable program code configured to identify recipients with predetermined data tags satisfying the sharing condition; and computer usable program code configured to transmit the electronic message to the identified recipients.

These and other features, aspects and advantages of the present invention will become better understood with reference to the following drawings, description and claims.

DETAILED DESCRIPTION OF THE INVENTION

Figure 1:
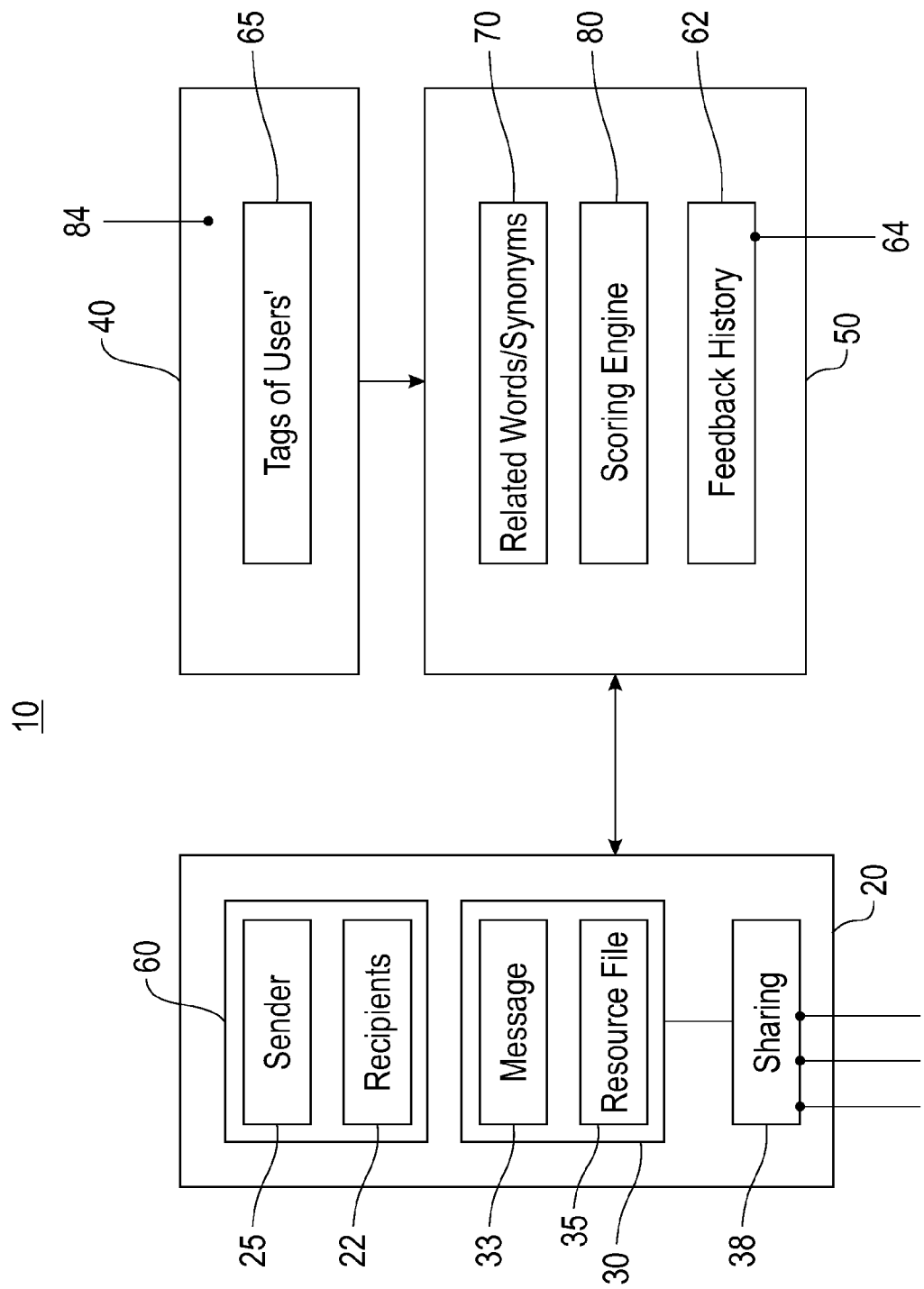
FIG. 1 is a block diagram illustrating a system for information and resource distribution in accordance with an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention provide a method and system for using tags to provide information distribution and access to messages and file resources. Exemplary embodiments of the present invention provide methods and systems that facilitate targeting of recipients through collaborative user input of tags (keywords) into a tagging system and matching recipients or users based on their defined eligible tags.

Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction performance system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Exemplary embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1, a system 10 may be employed message distribution. The system 10 may generally include an electronic mail server 20, a recipient selection tool 50, and a people tagging system 40.

The electronic mail server 20 may include messages to be distributed 33. The electronic mail server 20 may also include accounts for users 60 which, for ease of reference, can be thought of as including a sender 25 and a set of potential recipients 22. A sharing condition 38 may be associated with a message 33 to indicate what kinds of recipients the message 33 is targeting. A sharing condition 38 may include three components; they are an expression of keywords 55, a tag filter 56, and an option for approximate matching 57.

The recipient selection tool 50 may include software capable of determining whether the tags 65 associated with a user 60 in the people-tagging system 40 satisfies the sharing condition 38 of a message or not. In an exemplary embodiment of the system 10, the tag matching tool 50 may include sub-elements such as a related tag/synonym engine 70 capable of providing an approximation matching by analyzing keywords in expression 55 to match tags 65 within an estimated degree of relation to one another. The recipient selection tool 50 may additionally include a scoring/matching engine 80 to rank the degree of matching between the tags 65 of potential recipients 22. The recipient selection tool may also include a feedback history recorder 62 to accept feedback from recipients to evaluate the accuracy of the tag matching tool 50.

The people tagging system 40 may be an electronic platform for storing the tags 65 applied to each user 60. The people tagging system 40 enables users 60 to apply tags 65 to each other so as to maintain each other's interests and expertise.

In one exemplary embodiment, a sender 25 wishes to distribute a message 33 to potential interested recipients 22.

Figure 2:
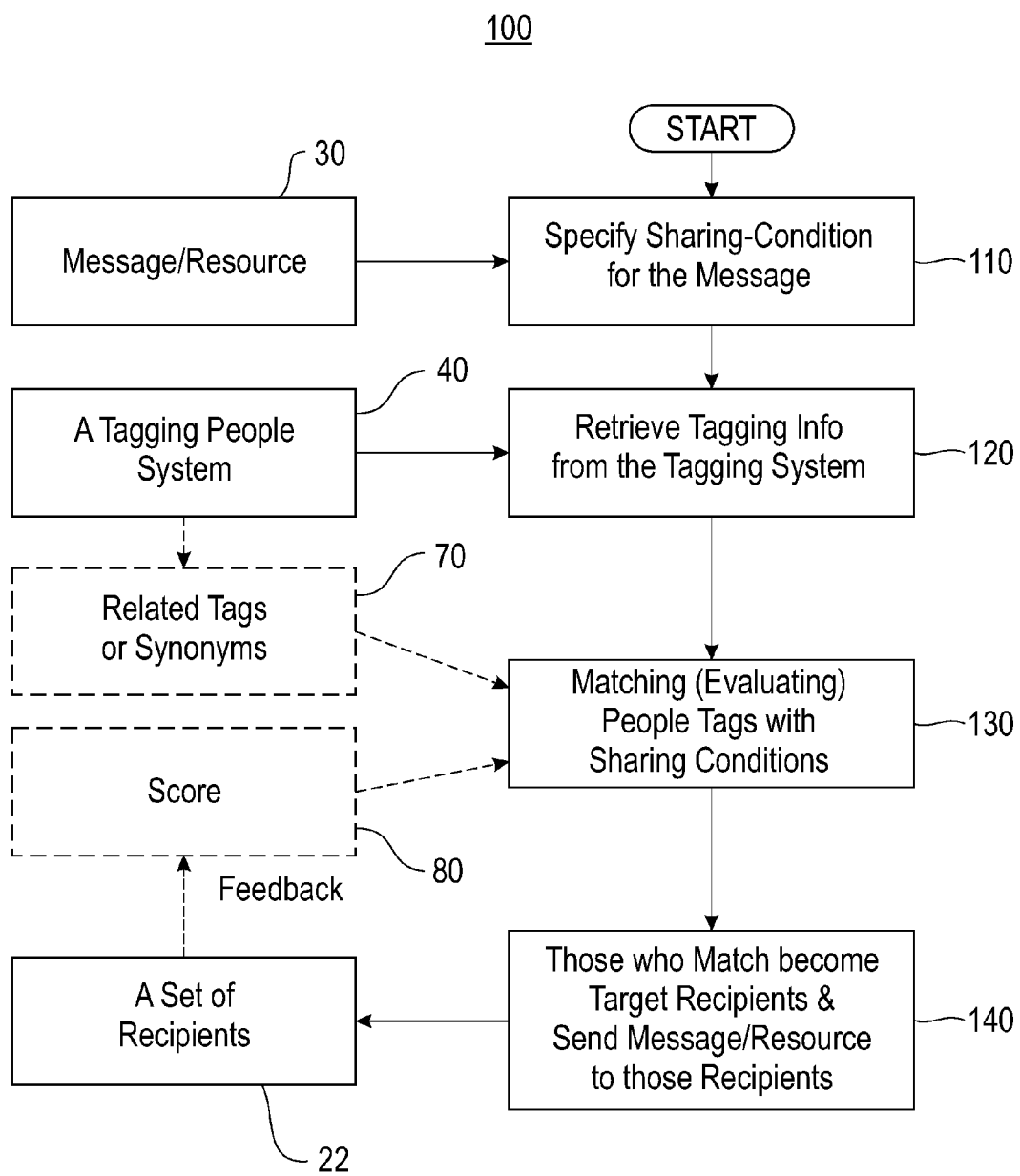
FIG. 2 is a block diagram illustrating a system for information and resource access in accordance with an exemplary embodiment of the present invention.

Referring to FIGS. 1 and 2, the system 10 may be employed to provide distribution of messages 33 under various exemplary scenarios. For example, a general operation of the system 10 may function according to the method 100 as follows. A sender 25, may wish to distribute an electronic message 33 to other users 60 in her organization, in this case, potential recipients 22, who are likely to be interested in the electronic message 33. The people-tagging system 40 would include a database where each user 60 would have been applied a list of tags 65 that represent the expertise and interests of the user 60. In step 110, the sender 25 may specify a sharing condition for distributing the message 33 to qualified or interested target recipients 22 based on keywords included within the message 33 or keywords that relate in general to the topic of the message. In step 120, the recipient selection tool 50 may retrieve tagging information stored in the people tagging system 40. The tagging information may include data such as the lists of tags 65 associated with each user 60 and the tagging relations between users 60 which indicates who applied which tags to whom. For example, the sender 25 may specify that the message 33 is targeting everyone who has been tagged with keywords "security" or "cryptography" by any user in the system. Software may be employed to aid the specification of the sharing condition. In step 130, every potential recipient 22's tagging information may be evaluated against the sharing condition 38 associated with the electronic message 33 to find one or more potential recipients 22 whose associated tags and data match the sharing condition 38. If a potential recipient 22's tags satisfy the sharing condition 38 of the message 33, the message 33 may be delivered to the recipient 22 in step 140. Depending on the sharing condition 38, synonyms and closely-related terms may be taken into account during the evaluation process in step 130 for matching recipients 22 with a sharing condition through the use of the related tag/synonym engine 70. The sharing condition 38 may also specify only tags applied by those who can be taken into account. For example, a sender 25 may specify that only tags applied by her to other users are considered.

Additionally, the recipients 22 of the message 33 may provide feedback to the recipient selection tool 50 on whether the recipient themselves consider the received message 33 relevant to them. If a recipient 22 provides a positive feedback, that recipient's chance of receiving future messages on topics similar to that of the message 33 increases; otherwise, if a negative feedback is given, the chance of receiving similar messages in the future decreases. In one exemplary embodiment, a feedback process may operate according to the following: after receiving a message 33, a recipient 22 may inform the recipient selection tool 50 whether he or she likes the message 33 or not. The recipient's 22 feedback will affect his or her chance of receiving future messages on topics similar to the message 33. For every user 60, the recipient selection tool 50 may maintain an interest-rating counter 64 for each of the most important keywords of the delivered messages. If the user 60 provides a positive feedback on message 33, the interest-ratings of the top keywords of the message 33 will increase; otherwise, if a negative feedback is made, such ratings will decrease. Negative interest-ratings have negative impact on the matching scores of future messages containing the corresponding keywords and decrease the user's 60 chance of receiving such messages. A neutral feedback rating may have no impact on the matching scores of future messages.

A scoring engine 80 may assist in the matching process by choosing the recipients 22 of the message 33. The scoring engine 80 may compute a matching score between the tags of each user 60 and the list of words (tags) entered into the sharing condition. The tagging information 65 of users 60 can be retrieved from the people-tagging system 40. One exemplary computation used by the scoring engine 80 may be calculated according to the following: L may represent the list of keywords 55 in the sharing condition of a message 33 represented by M and T may represent the set of tags 65 of a user 60 in the people-tagging system 40. In some cases, the user 60 may be tagged with the same keyword multiple times. Generally speaking, the more times a user 60 has been tagged with a keyword t, the higher the confidence that the user 60 is relevant to the keyword t. The number of terms in the intersection of L and T that a user 60 has been tagged at least k times may be represented by the equation: $N(L \cap T, k)$. Thus, a matching score represented by C(M, user) between the message M and the user 60 may be computed as follows:

$$C(M, \text{user}) = w1 \times N(L \cap T, 1) + w2 \times N(L \cap T, 3)$$

where w1, w2>0. Thus, for every term in L that the user 60 has been tagged, an amount w1 may be added to the matching score. Also, for every term in L that user 60 has been tagged at least 3 times, a bonus w2 may be added to the matching score.

After the scoring engine 80 computes the matching scores for all users, the recipient selection tool 50 may sort the potential recipients 22 based on the matching scores and delivers the message 33 to the top number of recipients 22 in the sorted list. The sender 25 may specify the value for the top number to control the number of recipients 22 of the message 33. If the sender 25 does not specify the desired number of recipients 22 of the message 33, the system 10 may deliver the message 33 to everyone with a matching score greater than 0. In such a case, sorting is not needed. During an approximated matching process, the related tags/synonyms engine 70 may further refine recipient selection by taking synonyms and closely-related terms into account when computing the matching scores.

Figure 3:
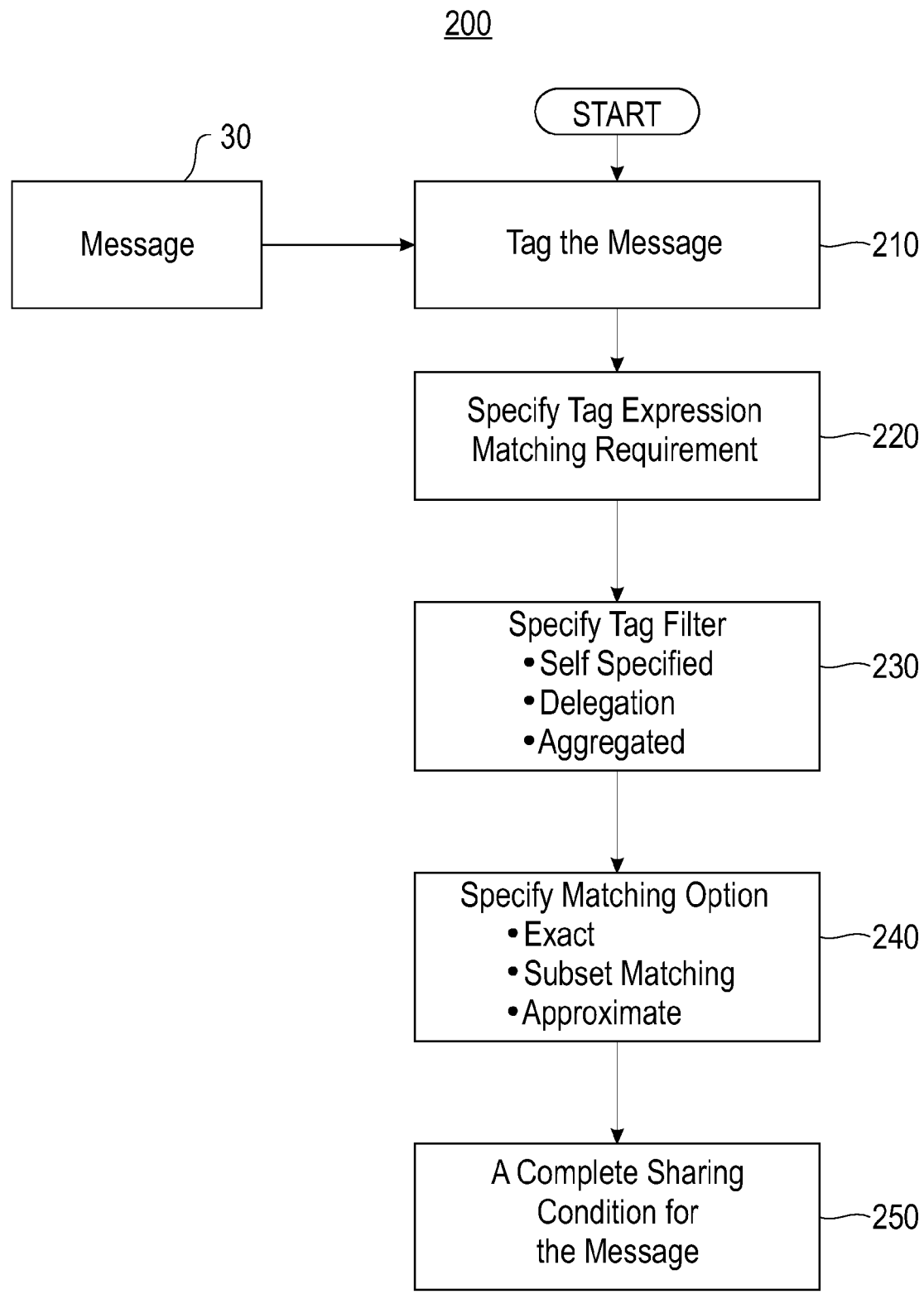
FIG. 3 is a flowchart illustrating a method of selective information distribution in accordance with an exemplary embodiment of the present invention.

Referring to FIG. 3, a method 200 illustrates an exemplary series of steps for creating a sharing condition. The sharing condition of a message 33 may specify what kinds of users 60 the message is targeting. A sharing condition may include three components: a keyword expression 55, a tag filter 56, and an option for approximate matching 57. In step 210, the message 33 may be tagged with a list of keywords. In operation, the sender 25 of the message 33 may tag the message with a list of keywords manually. The keywords the sender 25 chooses should be keywords related to the message 33 or related to the stored tag information of potential recipients 22 who may be interested in the message 33. For instance, if the message 33 is an announcement of an impending talk on cryptography, the sender 25 may tag the message 33 with the keywords "cryptography" and "security". If the sender 25 thinks that users 60 associated with the topic of information theory may also be interested in the talk, the sender 25 may tag the message 33 with the keywords "information theory" as well.

One may also appreciate that instead of tagging the message 33 manually, the sender 25 may alternatively let the recipient selection tool 50 automatically tag the message 33. The recipient selection tool may be able to extract keywords from the message 33 and tag the message 33 with those keywords. For example, to extract keywords from the message 33, the recipient selection tool 50 may compute the Term Frequency-Inverse Document Frequency (TF-IDF) weight of every word appearing in the message 33 and then picks the ones with the highest weights as keywords. Additionally, the recipient selection tool 50 may add a bonus to the weights of words that are often used as tags by users 60 as gleaned from past message records or people-tagging statistics. Thus, words that are often used as tags by the users 60 may have a better chance to be automatically selected as keywords. Any method to extract keywords from the message can be used and is within the scope. Additionally, the sender 25 may modify the list of keywords automatically selected by the recipient selection tool 50 before sending the message 33.

In step 220, a keyword expression is created by using "AND" or "OR" to connect the list of keywords selected in step 210. If the sender uses "AND" to connect the keywords, then a recipient satisfies the expression only if her tags match all the keywords in the expression. By default, the list of keywords are connected using "OR".

In step 230, the sender 25 may create a sharing condition by choosing a tag filter 56 option for the message 33. A tag filter 56 may determine what kinds of tags 65 in the people-tagging system 40 will be considered when the recipient selection tool evaluates potential recipients 60 against the sharing condition 38. Exemplary tag filters may include a "self-specified" option, a "delegation" option, and an "aggregated" option. The "self-specified" tag filter may consider the tags 65 applied by the sender 25 to others. The "delegation" tag filter may consider the tags 65 applied by the sender 25 itself or by those users 60 used to be tagged by the sender 25. For example, assuming that a user 60 named Alice is the sender 25 and a user 60 named Bob has previously been tagged by Alice, then, with "delegation" tag filter, the tags 65 in the people-tagging system 40 that are applied by Alice or Bob count, while the tags 65 applied by another user 60 named Carl do not count if Alice has never tagged Carl in the people-tagging system 40. The "aggregated" tag filter may allow all the tags 65 in the people-tagging system 40 to be considered. The "self-specified" filter allows the sender 25 to fully control the set of recipients 22 of the message 33, while the other two filters utilize collaborative efforts in determining recipients 22.

Additionally, the sender 25 may, in step 240, choose the option of approximated matching. If the option for approximated matching is selected, synonyms and closely-related terms used in tags 65 may be identified and taken into account when the recipient selection tool 50 evaluates a recipient's 22 tags 65 against the sharing condition of the message 33. For example, "www" and "world wide web" would be exemplary keywords that may be considered synonyms and may thus, be considered to match each other. If approximated matching is not selected, the recipient selection tool 50 may perform exact string matching where the exemplary keywords "www" and "world wide web" may be considered different and thus, not matching one another.

Besides message distribution, exemplary embodiments of the present invention may comprise another method of sharing information/resources. In another exemplary embodiment, a method may control electronic access to a file resource stored on a host server by granting access to users whose tags in a people-tagging system satisfy the sharing condition of the file.

Referring again to FIG. 1, the system 10 may also be employed to control electronic access to a resource file on a host server. In the following, the sender 25 is understood as the source of the file resource 35 and the recipients 22 are users who may request to access the file resource 35. It is also to be understood that in this type of deployment, the system 10 may include a host server 20 instead of an e-mail server, an access control tool 50 instead of a recipient selection tool, and a people-tagging system 40.

Figure 4:
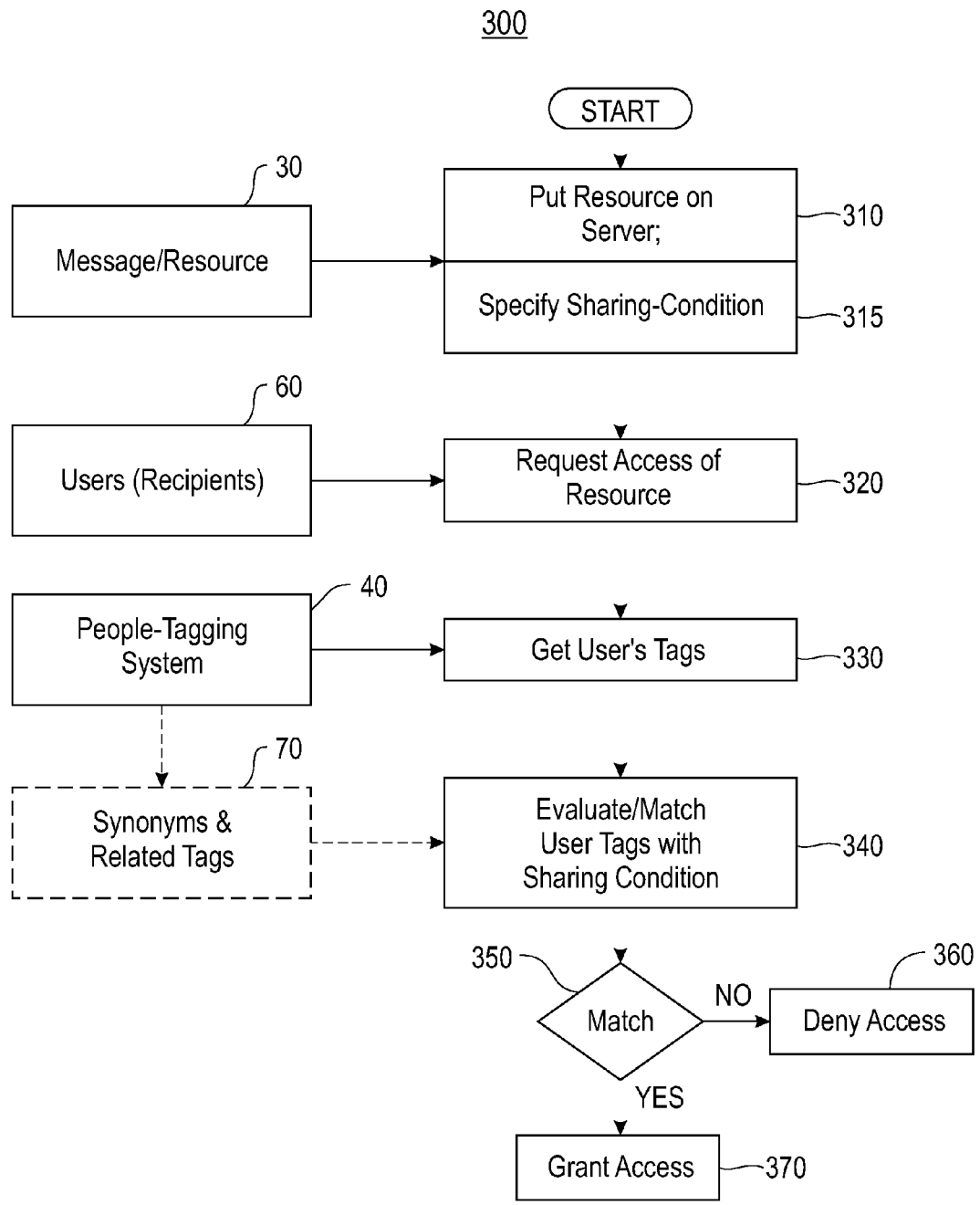
FIG. 4 is a flowchart illustrating a method of creating a sharing condition in accordance with an exemplary embodiment of the present invention.

In an exemplary embodiment, referring to FIG. 4, a series of steps illustrate a method 300 of controlling access for the sharing of resource files 35 by placing them on a host server 20. In this embodiment, the access control tool 50 is installed on the same server as the host 20. In step 310, a source 25 places the resource file 35 on the host server 20. In step 315, a sharing condition 38 is specified by the resource 25 for the resource file 35 that should be satisfied before allowing access to the resource file 35. In step 320, a potential recipient 22 requests access to the resource file 35 on the host server 20. In step 330, the access control tool 50 may retrieve the potential recipient 20 tagging information 65 from the people tagging system 40. In step 340, the access control 50 may perform an evaluation on the potential recipient's 22 tagging information 65 against the sharing condition 38 of the resource file 35. Use of the synonym/related tag engine 70 may be employed during step 330 as well. A decision is made in step 350 to see if the potential recipient's 22 tagging information 65 satisfies the sharing condition 38. A no result denies the potential recipient access to the resource file 35 in step 360 while a yes result grants the recipient 22 access to the resource file 35 in step 370.

Figure 5:
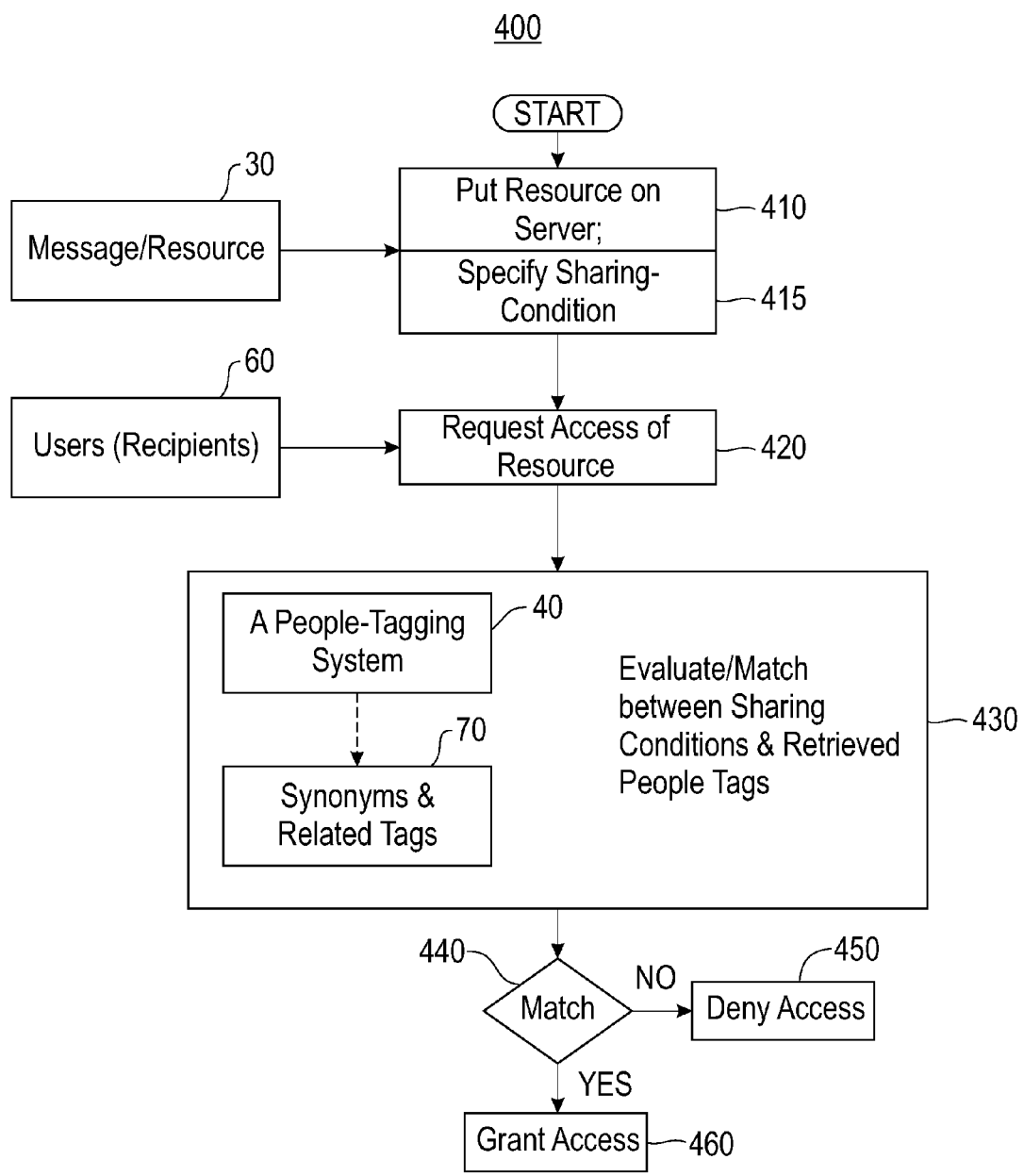
FIG. 5 is a flowchart illustrating a method of selective information access in accordance with an exemplary embodiment of the present invention.

Referring to FIG. 5, another exemplary embodiment is illustrated according to a series of steps in a method 400. The method 400 may be employed when the people tagging system 40 and the access control tool 50 are physically on the same server. In step 410, a source 25 places the resource file 35 on a host server 20. In step 415, a sharing condition is specified for the resource file 35 that should be satisfied before allowing access to the resource file 35. In step 420, a potential recipient 22 may request access to the resource file 35 on the host server 20. The host server 20 may forward the potentials recipient's 22 request and the sharing condition 38 associated with the resource file 35 to the people tagging system 40. In step 430, the access control system 50 may perform an evaluation on the potential recipient's 22 tagging information 65 against the sharing condition 38. Use of the synonym/related tag engine 70 may be employed during step 430 as well. A decision is made in step 440 to see if the potential recipient's 22 tagging information satisfies the sharing condition. The decision is then sent to the host server 20. A no result denies the potential recipient 22 access to the resource file 35 in step 450 while a yes result grants the recipient 22 access to the resource file 35 in step 460.

Figure 6:
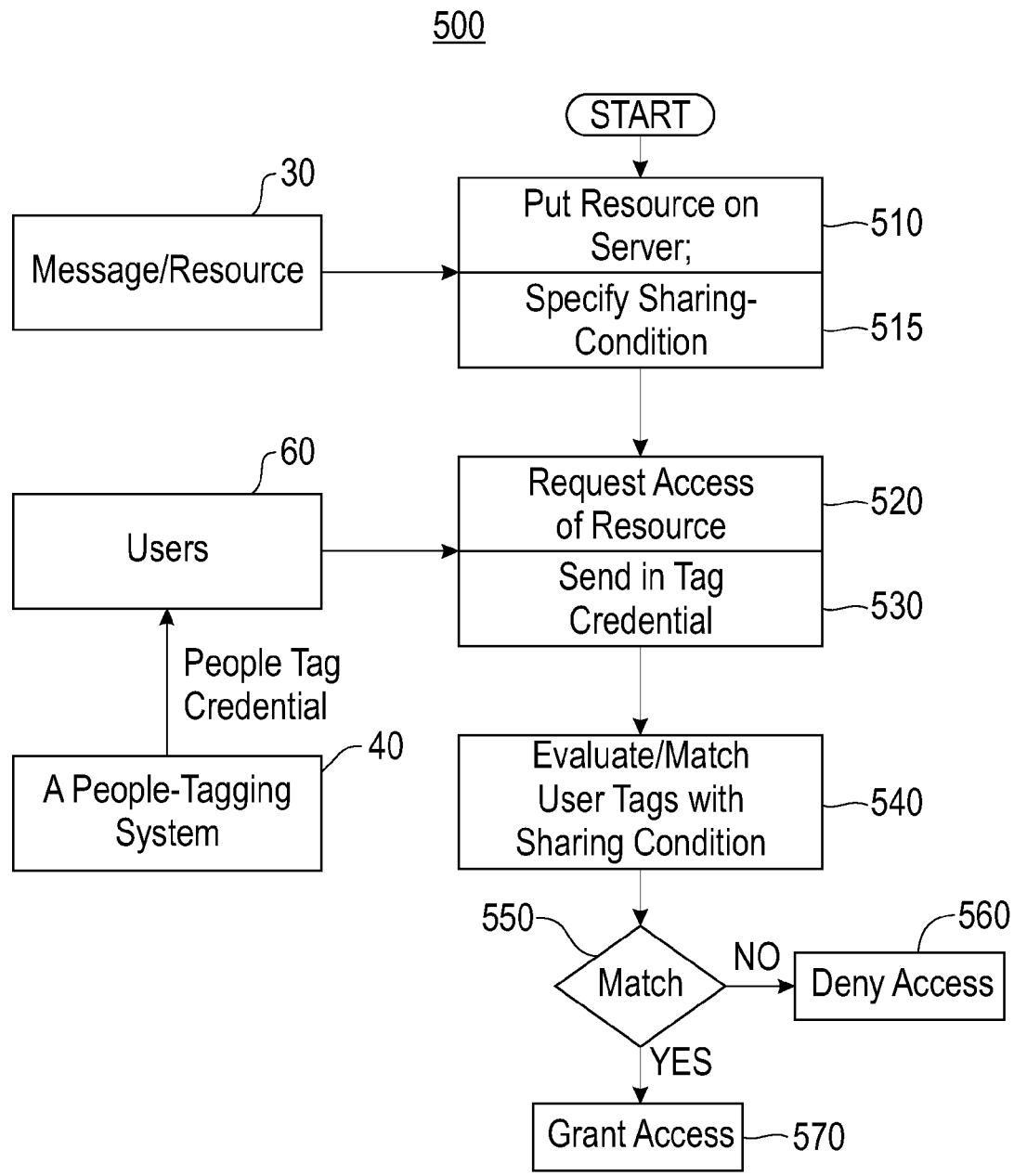
FIG. 6 is a flowchart illustrating a method of selective information access in accordance with another exemplary embodiment of the present invention.

Referring to FIG. 6, in still yet another exemplary embodiment, a method 500 is illustrated according to the following exemplary series of steps. The method 500 may be employed when the access control tool 50 is installed on the same server as the host 20 and the people-tagging system 40 upon receiving a user request can issue a tag credential 84 based on a user's tagging information 65. Each potential recipient 22 wishing to access the host server 20 may request a tag credential 84 prior to requesting access. The people-tagging system 40 may issue the user's tag information 65 as comprising his tag credential 84. The tag credential 84 may be stored by the corresponding potential recipient 22. In step 510, the source 25 places the resource file 35 on the host server 20. In step 515, a sharing condition is specified for the resource file 35 that should be satisfied before allowing access to the resource file 35. In step 520, a potential recipient 22 requests access to the resource file 35 on the host server 20. In step 530, the potential recipient's tag credential 84 may be presented to the host server 20. In step 540, the access control tool 50 may perform the evaluation of the potential recipient's 22 tagging information 65 presented in his credential against the sharing condition 38 of the resource file 35. A decision is made in step 550 to see if the potential recipient's 22 tagging information 65 matches the sharing condition. A no result denies the potential recipient 22 access to the resource file 35 in step 560 while a yes result grants the recipient 22 access to the resource file 35 in step 570.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be understood, of course, that the foregoing relate to exemplary embodiments of the invention and that modifications may be made without departing from the spirit and scope of the invention as set forth in the following claims.

We claim:

1. A system for sharing electronic data files, comprising:
a computer processor;
an electronic network configured to store and transmit by the computer processor the electronic data files wherein the electronic data files include one or more data tags defining a sharing condition;
a tagging system connected in data communication with the electronic network wherein the tagging system provides an electronic platform configured to store and update data tags defined by recipient users wherein each of the recipient users applies tags to a plurality of the recipient users;
a recipient selection tool including software configured to match recipient users to transmitted electronic data files, wherein the recipient users are associated with data tags that satisfy the sharing condition, and
wherein the recipient selection tool includes a first option for exact string matching and a second option for approximate string matching such that synonyms in the data tags are taken into account in the approximate string matching; and
a tag filtering system configured to limit consideration of the data tags that satisfy the sharing condition to data tags sent by a sender and data tags sent by those of the recipient users tagged by the sender.

2. The system for sharing electronic data files of claim 1, further comprising a related words/synonyms engine in the recipient selection tool wherein the related words/synonyms engine searches for other data tags that are related to or are synonyms of the data tags in the sharing condition.

3. The system for sharing electronic data files of claim 1, further comprising a scoring engine configured to evaluate and track an accuracy of matching transmitted electronic data files to recipient users.

4. The system for sharing electronic data files of claim 3, wherein the scoring engine receives a feedback data from one of the recipient users and uses the feedback data to determine a likelihood of said recipient user receiving another electronic data file similar to the electronic data file that was the subject of the feedback data.

5. The system for sharing electronic data files of claim 1, wherein the recipient selection tool includes an interest-rating counter tracking an interest-rating for keywords of delivered messages.

6. A method of distributing an electronic message from a sender to one or more recipients, comprising:
marking the electronic message with tags;
specifying a sharing condition for targeting potential recipients of the electronic message wherein the sharing condition is based on the tags;
identifying recipients with predetermined data tags satisfying the sharing condition;
attaching a weight to each of a plurality of keywords in the message based on frequency of the keywords in the message and modifying the weight of each of the plurality of the keywords based on the frequency that one of the tags is used by a user;
extracting some of the plurality of keywords from the message based on the weight of each of the plurality of keywords; and
transmitting the electronic message to the identified recipients.

7. The method of distributing an electronic message of claim 6, further comprising specifying a tag filter option to determine an accuracy in satisfying the sharing condition.

8. The method of distributing an electronic message of claim 7, wherein the tag filter option is based according to the sender's tags or the potential recipients' predetermined tags.

9. The method of distributing an electronic message of claim 6 wherein the sharing condition takes into account synonyms and related words of the tags in the electronic message.

10. The method of distributing an electronic message of claim 6 further comprising requesting feedback from an identified recipient who received the transmitted electronic message wherein the feedback includes whether said recipient was interested in the message.

11. The method of distributing an electronic message of claim 10 wherein;
said recipient receives more electronic messages in the future that contain tags similar to the tags in the transmitted electronic message if said recipient provided positive feedback; and
said recipient receives less electronic messages in the future that contain tags similar to the tags in the transmitted electronic message if said recipient provided negative feedback.

12. The method of distributing an electronic message of claim 6 wherein the electronic message is automatically tagged based on keywords extracted from the electronic message that are determined to describe the topic of the message and have a frequent use among senders and recipients.

13. The method of distributing an electronic message of claim 12 wherein the sender may modify automatically tagged tags manually.

14. A method of providing electronic access to a file resource stored on a host server, comprising:
specifying a sharing condition for permitting access to the file resource based on keywords tagged in the file resource;
receiving a request for access to the file resource from a user;
receiving user data associated with the user wherein the user data includes a list of keywords associated with the user;
specifying whether the user is relevant to one of the list of keywords based on the number of times the user is tamed with a specified one of the list of keywords;
evaluating whether the user's list of keywords satisfies the sharing condition based on whether the user is relevant to one of the list of keywords;
denying the user access to the resource file on the host server if the sharing condition is not satisfied; and
granting the user access to the resource file on the host server if the sharing condition is satisfied.

15. The method of providing electronic access to a file resource of claim 14, wherein the step of receiving user data includes the user data being sent by the user as a tag credential wherein the tag credential is generated from a people-tagging system at a request of the user and wherein the tag credential includes tagging information including the keywords associated with the user.

16. The method of providing electronic access to a file resource of claim 14, wherein the steps of receiving the user data and evaluating the user's list of keywords occur in the same physical server as the host server.

17. The method of providing electronic access to a file resource of claim 14, wherein:
   the steps of receiving user data include retrieval of user data from a people-tagging system server; and
   wherein the steps of receiving user data and evaluating the user's list of keywords occur in the people-tagging system server.

18. A computer program product stored on a non-transitory computer readable medium for distributing an electronic message, the computer program product comprising:
   computer usable program code configured to mark the electronic message with data tags;
   computer usable program code configured to attach a weight to each of a plurality of keywords in the message based on frequency of the keywords in the message, and to modify the weight of each of the plurality of the keywords based on the frequency of the keywords in past messages and frequency that the data tags are used by a user;
   computer usable program code configured to extract keywords from the message based on the weight of the keyword;
   computer usable program code configured to specify a sharing condition for targeting potential recipients of the electronic message wherein the sharing condition is based on the data tags that correspond to the extracted keywords,
   computer usable program code configured to identify recipients with predetermined data tags satisfying the sharing condition; and
   computer usable program code configured to transmit the electronic message to the identified recipients.

19. The computer program product of claim 18, further comprising computer usable program code configured to request feedback from an identified recipient who received the transmitted electronic message wherein the feedback includes whether said recipient was interested in the message; and
   computer usable program code configured to evaluate the feedback and determine whether the identified recipient receives future electronic messages that contain data tags similar to the data tags in the transmitted electronic message.

20. The computer program product of claim 18, further comprising computer usable program code configured to identify synonyms and related words within a file associated with a potential user that satisfy the sharing condition.

* * * * *